(12) United States Patent
Kim

(10) Patent No.: US 8,201,959 B2
(45) Date of Patent: Jun. 19, 2012

(54) LIGHT UNIT AND DISPLAY APPARATUS HAVING THE SAME

(75) Inventor: Deung Kwan Kim, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 164 days.

(21) Appl. No.: 12/677,482

(22) PCT Filed: Sep. 11, 2008

(86) PCT No.: PCT/KR2008/005369
§ 371 (c)(1),
(2), (4) Date: Mar. 10, 2010

(87) PCT Pub. No.: WO2009/035272
PCT Pub. Date: Mar. 19, 2009

(65) Prior Publication Data
US 2011/0013377 A1    Jan. 20, 2011

(30) Foreign Application Priority Data
Sep. 11, 2007  (KR) .................... 10-2007-0091870

(51) Int. Cl.
*G09F 13/04*  (2006.01)
(52) U.S. Cl. ............... 362/97.3; 362/97.1; 362/249.02; 362/800
(58) Field of Classification Search ........ 362/97.1–97.4, 362/240, 249.01, 249.02, 800, 311.02, 79.3
See application file for complete search history.

(56) References Cited

U.S. PATENT DOCUMENTS

| | | | |
|---|---|---|---|
| 6,299,337 B1 * | 10/2001 | Bachl et al. | 362/545 |
| 7,281,816 B2 | 10/2007 | Suzuki | |
| 7,597,451 B2 | 10/2009 | Chikazawa et al. | |
| 7,607,790 B2 * | 10/2009 | Chen et al. | 362/97.1 |
| 7,663,730 B2 | 2/2010 | Shibata | |
| 2004/0065894 A1 * | 4/2004 | Hashimoto et al. | 257/100 |
| 2004/0218388 A1 | 11/2004 | Suzuki | |
| 2005/0133939 A1 * | 6/2005 | Chikugawa et al. | 257/790 |
| 2006/0289201 A1 | 12/2006 | Kim et al. | |
| 2007/0058358 A1 | 3/2007 | Chikazawa et al. | |
| 2007/0211205 A1 | 9/2007 | Shibata | |
| 2008/0094835 A1 * | 4/2008 | Marra et al. | 362/247 |
| 2008/0144315 A1 * | 6/2008 | Chen et al. | 362/249 |
| 2011/0002113 A1 | 1/2011 | Kim et al. | |

FOREIGN PATENT DOCUMENTS

| | | |
|---|---|---|
| CN | 1881043 A | 12/2006 |
| JP | 2004-319458 A | 11/2004 |
| JP | 2004-342587 A | 12/2004 |
| JP | 2006-58487 A | 3/2006 |
| JP | 2007-73290 A | 3/2007 |
| WO | WO 2007/078103 A1 | 7/2007 |

* cited by examiner

*Primary Examiner* — Evan Dzierzynski
(74) *Attorney, Agent, or Firm* — Birch, Stewart, Kolasch & Birch, LLP

(57) ABSTRACT

A light unit and a display apparatus having the light unit are provided. The light unit comprises a light emitting module comprising a light emitting diode and a connection terminal; a module connection member comprising a module terminal protruding to be electrically connected to the connection terminal of the light emitting module; and a bottom cover comprising the module connection member and the light emitting module.

20 Claims, 5 Drawing Sheets

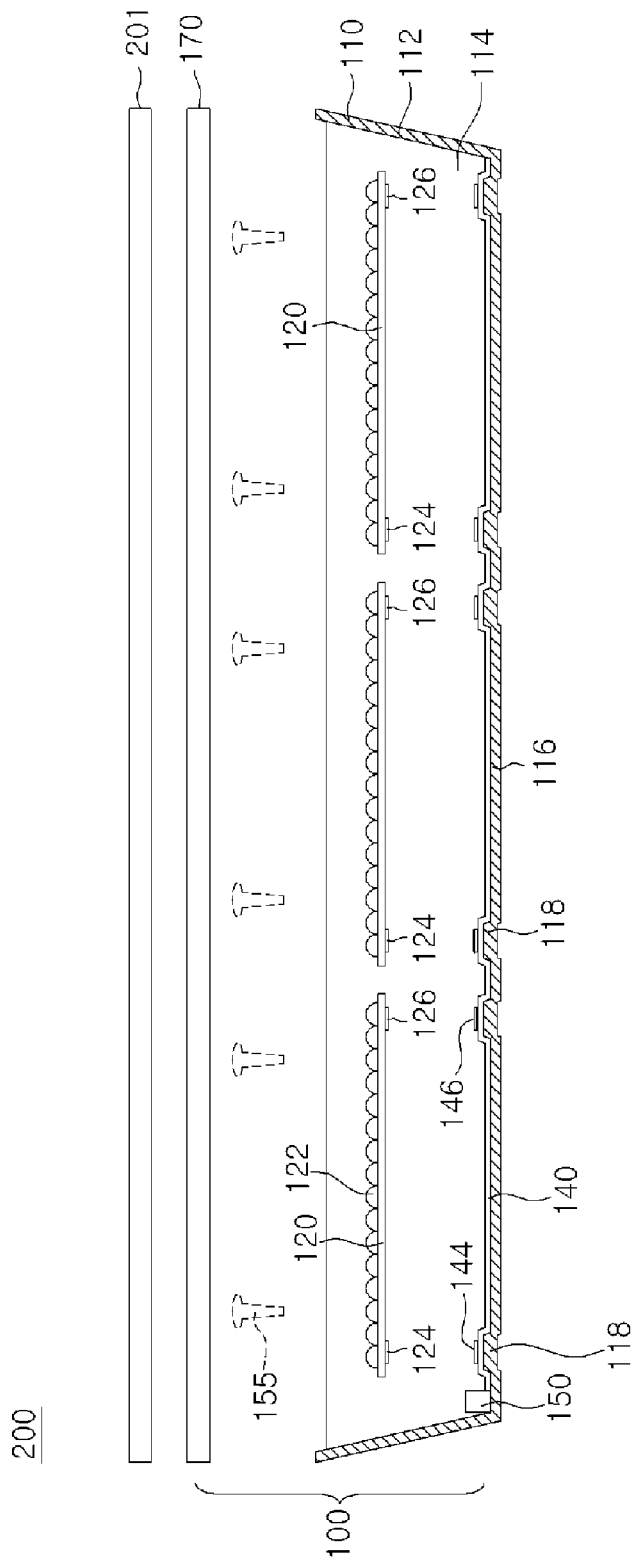

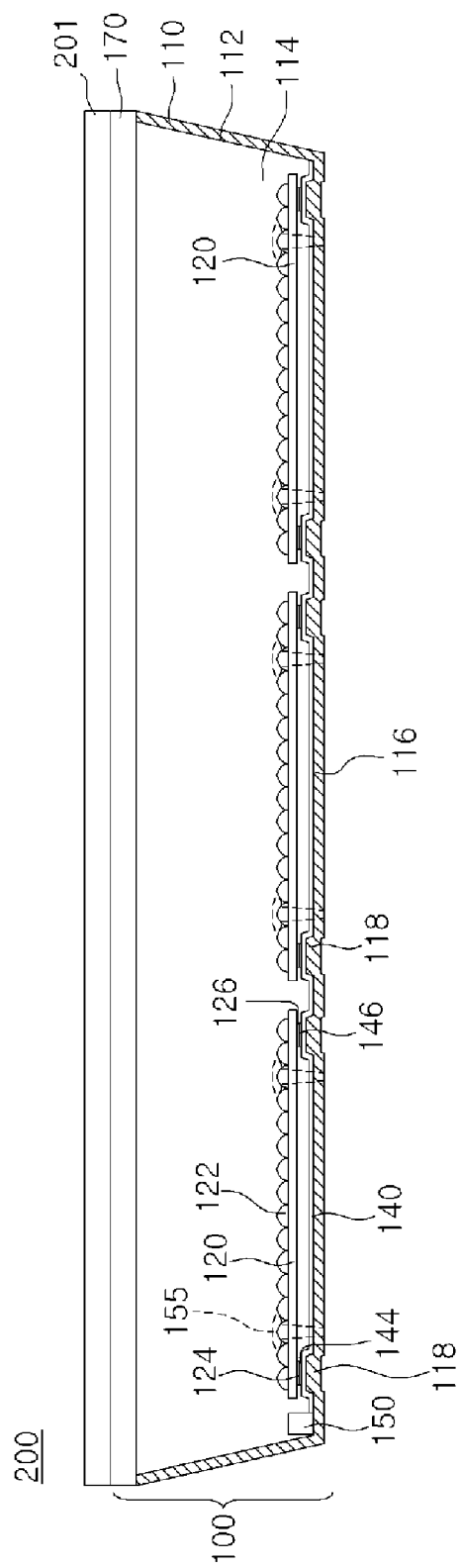
[Fig. 2]

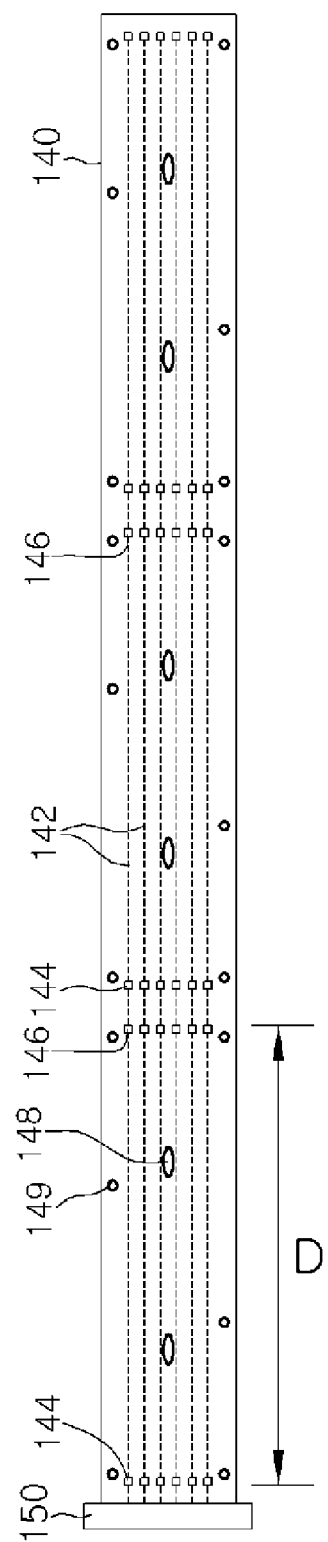
[Fig. 3]

[Fig. 4]
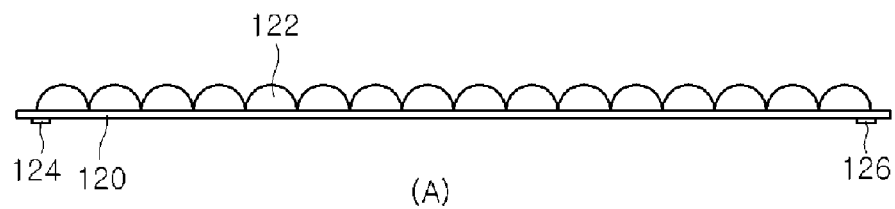
(A)
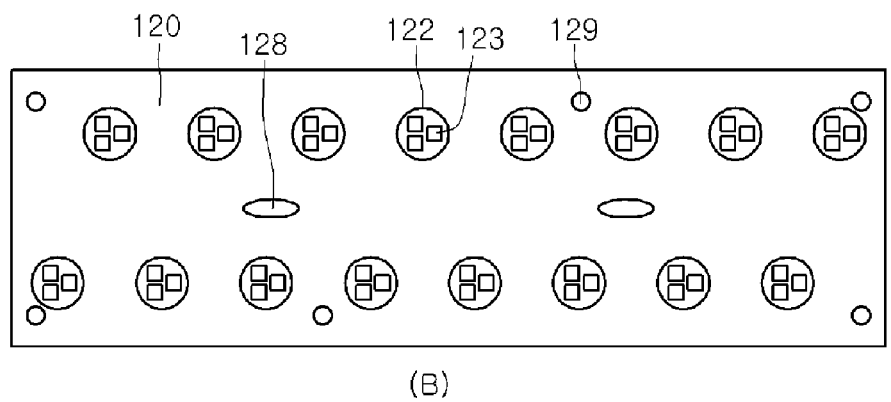
(B)
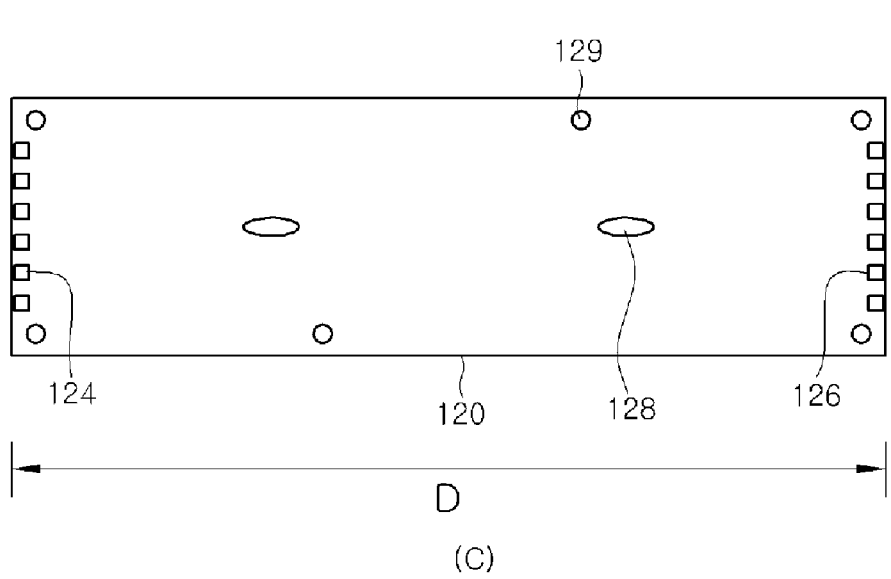
(C)

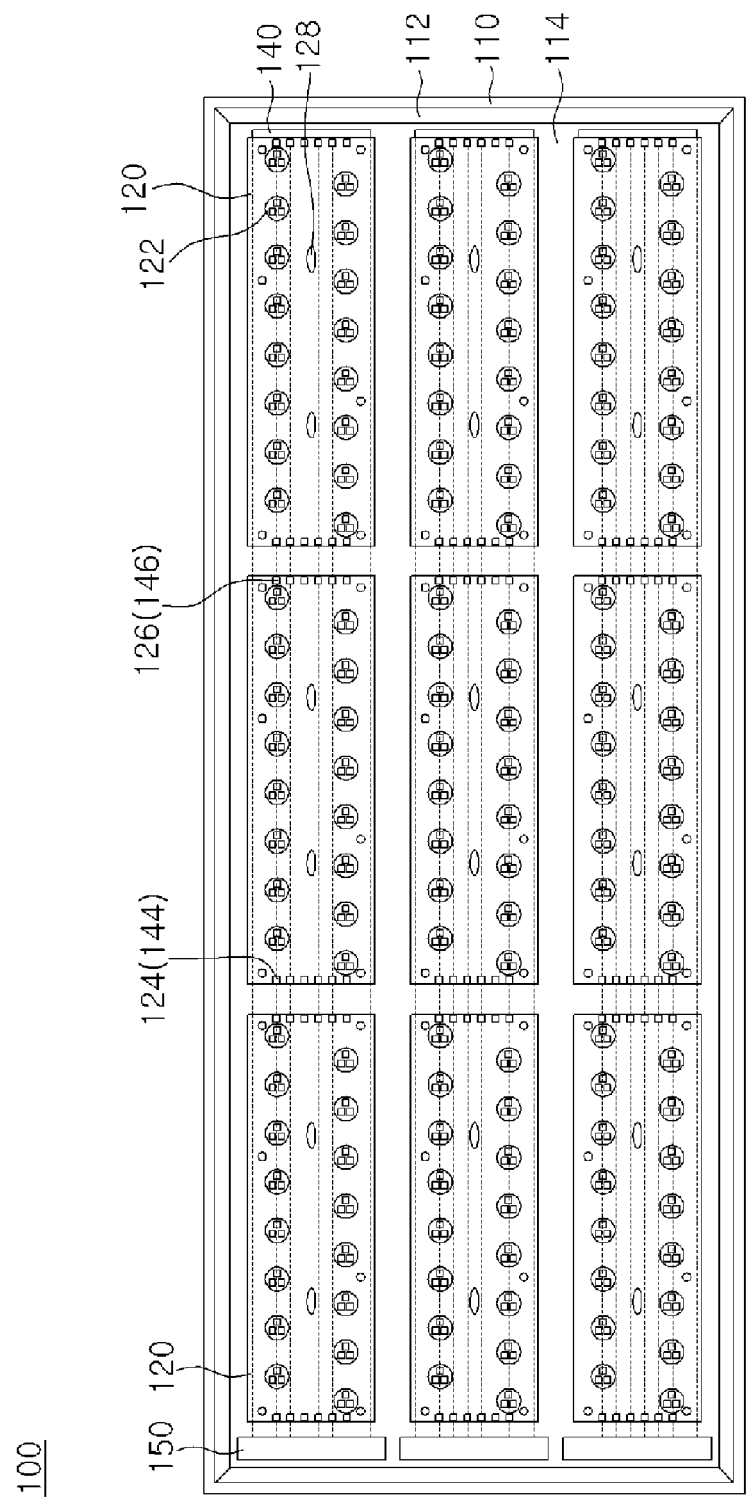
[Fig. 5]

US 8,201,959 B2

LIGHT UNIT AND DISPLAY APPARATUS HAVING THE SAME

TECHNICAL FIELD

The present disclosure relates to a light unit and a display apparatus having the light unit.

BACKGROUND ART

A cathode ray tube (CRT), a liquid crystal display (LCD) device using an electric field optical effect, a plasma display panel (PDP) using gas discharge, and an electro luminescence display (ELD) using an electric field light emission effect, and the like are well known as display devices. The LCD device among the display devices has been actively researched.

The LCD device has been used as a monitor of a laptop computer, a monitor of a desktop computer, or a large-sized information display device.

Since the LCD device is a non-emissive (passive type) display device that can display an image by adjusting an amount of light emitted from a backlight unit such as, for example, a light emitting diode (LED) panel.

DISCLOSURE OF INVENTION

Technical Problem

Embodiments provide a light unit that is designed to dispose a light emitting module without performing a soldering process, and a display apparatus having the light unit.

Embodiments provide a light unit that is designed such that a module connection member can be electrically connected to a light emitting module by projection a module terminal of the module connection member under the light emitting module, and a display apparatus having the light unit.

Embodiments provide a light unit that is designed such that a flexible module connection member on a bottom cover can be electrically connected to a light emitting module by forming a protrusion on a bottom surface of the bottom cover.

Technical Solution

An embodiment provides a light unit comprising: a light emitting module comprising a light emitting diode and a connection terminal; a module connection member comprising a module terminal protruding to be electrically connected to the connection terminal of the light emitting module; and a bottom cover comprising the module connection member and the light emitting module.

An embodiment provides a light unit comprising; a bottom cover comprising a plurality of protrusions; a module connection member comprising a module terminal disposed at least one of the protrusions of the bottom cover; and a plurality of light emitting modules comprising a light emitting diode and a connection terminal electrically connected to the module terminal of the module connection member.

An embodiment provides a display apparatus comprising; a bottom cover comprising a bottom surface with a plurality of protrusions; a module connection member on the bottom surface of the bottom cover and comprising a module terminal disposed at least one of the protrusions of the bottom cover; a light emitting module on the module connection member and comprising a light emitting diode and a connection terminal electrically connected to the module terminal of the module connection member; an optical sheet unit on the light emitting module; and a display panel on the optical sheet unit.

Advantageous Effects

According to embodiments, the electrical connection structure of the light emitting modules can be realized without performing a soldering process.

In addition, a manufacturing process of the light unit can be improved.

Further, the replacement of the light emitting modules can be easily realized.

BRIEF DESCRIPTION OF THE DRAWINGS

FIG. 1 is an exploded sectional view of a display apparatus according to an embodiment.

FIG. 2 is a sectional view of FIG. 1, when the display apparatus is assembled.

FIG. 3 is a top plan view of a module connection member according to an embodiment.

FIGS. 4A, 4B, and 4C are respectively sectional, top plan, and bottom views of a light emitting module according to an embodiment.

FIG. 5 is a top plan view of a light unit according to an embodiment.

BEST MODE FOR CARRYING OUT THE INVENTION

Reference will now be made in detail to the embodiments of the present disclosure, examples of which are illustrated in the accompanying drawings.

FIG. 1 is an exploded sectional view of a display apparatus according to an embodiment, FIG. 2 is a sectional view of FIG. 1, when the display apparatus is assembled, FIG. 3 is a top plan view of a module connection member according to an embodiment, FIGS. 4A, 4B, and 4C are respectively sectional, top plan, and bottom views of a light emitting module according to an embodiment, and FIG. 5 is a top plan view of a light unit according to an embodiment.

Referring to FIGS. 1 and 2, a display apparatus 200 comprises a light unit 100 and a display panel 201.

The light unit 100 is a light emitting device that is disposed behind the display panel 201 such as a liquid crystal panel and emits light toward the display panel 201. The light unit 100 comprises a bottom cover 110, one or more light emitting modules 120, and a module connection member 140.

The bottom cover 110 may be formed in a container shape provided with a top groove 114. The bottom cover 110 may be formed of a material having an excellent heat discharge property or metal such as, for example, aluminum (Al), magnesium (Mg), zinc (Zn), titanium (Ti), Tantalum (Ta), Hafnium (Hf), niobium (Nb), and the like. However, the present disclosure is not limited to these materials.

A side surface 112 of the bottom cover 110 may be inclined so that light can be reflected on the inclined side surface 112. A material or sheet having an excellent reflective property may be coated or attached on an inner circumference of the bottom cover 110. The bottom cover 110 functions as a chassis. The shape and side surface structure of the bottom cover 110 is not specifically limited.

One or more protrusions 118 are convexly formed on a groove bottom surface 116 of the bottom cover 110. The protrusions 118 have a predetermined height and are spaced apart from each other by predetermined distances. The protrusion 118 may be formed in a polygonal shape. The protrusions 118 may be disposed corresponding to opposite ends of each of the light emitting modules 120.

At least one module connection member 140 is disposed in the groove 114 of the bottom cover 110. The module connection member 140 may be a flexible flat cable or a flexible printed circuit board (PCB). The module connection member 140 closely contacts the groove bottom surface 116.

A connector 150 is formed on a first end of the module connection member 140. The connector 150 may be connected to an LED driver (not shown).

First and second module terminals 144 and 146 are formed on the module connection member 140 at predetermined intervals. The first and second module terminals 144 and 146 are disposed with a convex form on the respective protrusions 118 of the bottom cover 110. Therefore, the module terminals 144 and 146 protrude upward. The first and second module terminals 144 and 146 are electrically interconnected on the module connection member 140. The electrical connection circuit may be variously realized.

Here, although the protrusions 118 are formed on the bottom surface 116 of the bottom cover 110, the protrusions 118 may be omitted. Instead, portions of the connection member 140, which correspond to the first and second module terminals 144 and 146, may protrude.

At least one light emitting module 120 is disposed on the module connection member 140. First and second connection terminals 124 and 126 are disposed on an undersurface of the light emitting module 120. The light emitting module 120 may be a metal core PCB, an FR-4 PCB, a normal PCB, or the like. The light emitting module 120 may be variously modified within the scope of the disclosure.

A plurality of LEDs 122 are disposed on a top surface of the light emitting module 120. The LEDs 122 may be white LEDs or color LEDs. The color LEDs may comprise red, green, and blue LEDs. The color and type of the LEDs may vary. Here, the white LEDs may be a package comprising a blue LED chip and yellow phosphors or a package comprising red, green, and blue LED chips. A structure of the package may be variously modified.

The light emitting module 120 is electrically connected to the module connection member 140. The first and second connection terminals 124 and 126 of the light emitting module 120 correspond to the first and second module terminals 144 and 146 of the module connection member 140 and thus the first and second connection terminals 124 and 126 electrically contact the first and second module terminals 144 and 146, respectively.

At this point, the module connection member 140 electrically connects the light emitting modules 120 to each other. A group of the light emitting modules 120 interconnected by each of the module connection members 140 may be one driving unit.

The light emitting module 120 coupled to the bottom cover 110 by a fixing member 155 such as screws, rivets, adhesive, or the like. Since the light emitting module 120 is coupled to the bottom cover 110 by the module connection member 140, the first and second connection terminals 124 and 126 of the light emitting module 120 closely contact the first and second module terminals 144 and 146 of the module connection member 140, respectively, thereby improving the electrical reliability.

An optical sheet unit 170 is disposed on the bottom cover 110. The optical sheet unit 170 may comprise a diffuser sheet (not shown) and/or a prism sheet (not shown). The diffuser sheet diffuses the light emitted from the LEDs 122. The diffused light is collected on the light emitting region by the prism sheet. Here, the prism sheet may be a horizontal or/and vertical prism sheets or one or more luminance enhancing film.

When the display panel (e.g., an LCD panel) 201 is located on the optical sheet unit 170, the display panel displays information using the light emitted through the optical sheet unit 170.

In the above embodiment, since the light emitting module 120 of the light unit 100 is electrically connected to other modules without going through a soldering process, the manufacturing process can be simplified. In addition, since the light emitting module 120 is fixed by the fixing member 155 such as the screws, it can be easily replaced.

Cylindrical guide pins (not shown) may be disposed in the bottom cover 110 to support the optical sheet unit 170.

Referring to FIGS. 2 and 3, the module connection member 140 is provided with a plurality of linear metal lines 142. The number of the linear metal lines 142 corresponds to that of the pins of the first and second connection terminals 124 and 126 of the light emitting modules 120. Each of the linear metal line 142 interconnects the adjacent first and second module terminals 144 and 146.

The linear metal lines 142 are spaced apart from each other to correspond to the pins. Each of the linear metal lines 142 has a first end connected to the connector 150 and a second end that is formed on a close loop path or connected to another connector.

Here, the ends of the metal lines 142 may be interconnected by a closed loop circuit. For example, the ends of the two metal lines 142 are connected to each other to form the closed loop. At this point, terminals of the same color LED chips (red, green, and blue LED chips) connected to the two metal lines 142 can be interconnected as a circuit. Therefore, when a closed loop pattern is formed on the light emitting modules 120, there is no need to form a separate loop path on the module connection member 140.

The first and second module terminals 144 and 146 are connected along the respective metal lines 142.

The first and second module terminals 144 and 146 of the module connection member 140 are exposed to contact the respective first and second connection terminals 124 and 126 of the light emitting module 120. The metal lines 142 linearly connects the adjacent light emitting modules 120 to each other through the first and second module terminals 144 and 146.

The module connection member 140 is provided with fixing holes 149 and guide pin holes 148 that are disposed at predetermined intervals not to interfere with the metal lines 142.

Referring to FIGS. 3 and 4, the light emitting module 120 is also provided with fixing holes 129 and guide pin holes 128 that correspond to the fixing holes 149 and guide pin holes 148 of the module connection member 140, respectively. The fixing members 155 (see FIG. 1) are inserted through the fixing holes 129 and 149 and the guide pins (not shown) are inserted through the guide pin holes 128 and 148.

A distance D between the first and second module terminals 144 and 146 of the module connection member 140 is same as a distance D between the first and second connection terminals 124 and 126 of the light emitting module 120.

Referring to FIGS. 2 and 4, the light emitting modules 120 may be formed in a bar shape and interconnected in series or parallel.

The light emitting module 120 may comprise the LEDs 122, the first and second connection terminals 124 and 126, the fixing holes 129, and the guide pin holes 128. The first and second connection terminals 124 and 126 are input and output pins of the LEDs 122 of the light emitting module 120.

The LEDs 122 are interconnected in series or parallel by a metal line pattern and arranged in a zigzag pattern. However, the present disclosure is not limited to this configuration.

The fixing members 155 such as screws, rivets, and the like may be coupled to the respective fixing holes 129 to fix the light emitting module 120 on the bottom cover 110. The guide pins are inserted through the respective the guide pin holes 128. The guide pin holes 128 may selectively formed depending on whether the guide pins are installed or depending on installing locations of the guide pins.

As shown in FIGS. 4A and 4C, the first and second connection terminals 124 and 126 are disposed on one end or opposite ends of the undersurface of each of the light emitting modules 120 in accordance with a circuit pattern of the module substrate. The location and number of the pins of the first and second connection terminals 124 and 126 may be modified in accordance with the circuit pattern.

The first and second connection terminals 124 and 126 of the light emitting module 120 may be connected to a circuit of the LEDs 122 through, for example, via holes.

An assembling process of the light unit will be described with reference to FIGS. 1, 2, and 5. The module connection members 140 are arranged in parallel in the bottom cover 110. At this point, the first and second module terminals 144 and 146 of the module connection members 140 are disposed on the respective protrusions 118 of the bottom cover 110. At this point, the regions of the first and second module terminals 144 and 146 of the module connection members 140 are projected by the protrusions 118. The connector 150 disposed at a first end of the module connection member 140 is connected to the LED driver (not shown). Here, the connector 150 may be detachably or integrally formed on the module connection member 140.

At least one light emitting module 120 is disposed on the module connection members 140. At this point, the first and second connection terminals 124 and 126 of the light emitting module 120 are disposed on the first and second module terminals 144 and 146 of the module connection members 140, respectively.

After the above, the light emitting module 120 and the module connection members 140 are coupled to the bottom cover 110 by the fixing members 155.

Referring to FIG. 2, the fixing members 155 are coupled to the bottom cover 110 through the respective fixing holes 129 (see FIG. 4) and the respective fixing holes 149 (see FIG. 3). At this point, when the fixing members 155 are the screws, the light emitting module 120 and the module connection member 140 are biased toward the bottom cover 110 and thus the first and second connection terminals 124 and 126 can physically contact the first and second module terminals 144 and 146, respectively.

At this point, the first and second connection terminals 124 and 126 of the light emitting module 120 closely contact the first and second module terminals 144 and 146 of the module connection member 140, thereby improving the electrical connection reliability.

Further, contacting areas between the first and second module terminals 144 and 146 and the first and second connection terminals 124 and 126 may increase by the protrusions 118 of the bottom cover 110.

As the first and second connection terminals 124 and 126 of the light emitting module 120 electrically contact the first and second module terminals 144 and 146 of the module connection member 140, the first and second module terminals 144 and 146 of the module connection member 140 are connected to the LEDs 122 through the first and second connection terminals 124 and 126 of the light emitting module 120. Here, the module connection members 140 electrically interconnect the LEDs 122 disposed on the respective light emitting modules 120.

Since the first and second connection terminals 124 and 126 of the light emitting module 120 are electrically connected to the first and second module terminals 144 and 146 of the module connection member 140, there is no need to perform the soldering process for electrically interconnecting the light emitting modules 120.

Further, since the light emitting module 120 or the module connection member 140 can be replaced by separating the fixing members 155, the replacement of the components can be easily realized.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The embodiments can provide a light unit using LEDs, which can be applied to a variety of devices.

The embodiments can also provide a display apparatus having a direct type light unit.

The invention claimed is:

1. A light unit comprising:
a light emitting module comprising a plurality of light emitting diodes disposed thereon and connection terminals electrically connected to at least one of the light emitting diodes;
a module connection member comprising module terminals protruding to be electrically connected to the connection terminals of the light emitting module; and
a bottom cover containing the module connection member and the light emitting module,
wherein the module connection member is disposed between the light emitting module and a bottom surface of the bottom cover,
wherein the bottom cover includes a plurality of protrusions convexly protruded from a bottom surface of the bottom cover at predetermined intervals, and
wherein the module terminals are disposed between the connection terminals of the light emitting module and the plurality of protrusions of the bottom cover.

2. The light unit according to claim 1, wherein the bottom cover comprises a groove in which the module connection member and the light emitting module are disposed and an inclined side surface in circumference of the groove.

3. The light unit according to claim 1, wherein a plurality of the light emitting modules are disposed on the module connection member such that the plurality of the light emitting modules are electrically connected to each other by the module connection member.

4. The light unit according to claim 1, wherein the light emitting diode comprises at least one of a white light emitting diode and a color light emitting diodes emitting a light of the different color spectrum.

5. The light unit according to claim 1, wherein the connection terminals include a first connection terminal and a second connection terminal on an undersurface of the light emitting module to function as input and output pins.

6. The light unit according to claim 5, wherein the module terminals of the module connection member comprise first module terminals disposed under the first connection terminals and second module terminals disposed under the second connection terminals.

7. The light unit according to claim 1, wherein the light emitting module and the module connection member have a plurality of holes to be coupled to the bottom cover through the fixing members.

8. The light unit according to claim 1, wherein the module connection member interconnects ends of the light emitting module in the form of a closed loop.

9. The light unit according to claim 1, comprising a connector disposed on an end of the module connection member.

10. The light unit according to claim 1, wherein the module connection member comprises a flexible flat cable or a flexible printed circuit board.

11. The light unit according to claim 1, wherein the module connection member has a length longer than the light emitting module.

12. The light unit according to claim 1, wherein a center portion of an undersurface of the light emitting module is spaced from an upper surface of the module connection member.

13. A light unit comprising:
a bottom cover comprising a plurality of protrusions;
a module connection member comprising module terminals disposed on at least one of the protrusions of the bottom cover; and
a plurality of light emitting modules comprising a light emitting diode and connection terminals electrically connected to the module terminals of the module connection member,
wherein the module connection member is disposed between the plurality of light emitting modules and a bottom surface of the bottom cover,
wherein the plurality of protrusions are convexly protruded from the bottom surface of the bottom cover, and
wherein the module terminals are disposed between the connection terminals of each of the light emitting modules and each of the protrusions of the bottom cover.

14. The light unit according to claim 13, comprising a plurality of fixing members fix the light emitting modules and the module connection member toward the bottom cover.

15. The light unit according to claim 13, wherein the module connection member comprises a plurality of metal lines and the module terminals of the module connection member are disposed along each of the metal lines and spaced apart at predetermined intervals to correspond to the connection terminals of the light emitting modules.

16. The light unit according to claim 13, wherein the module connection member connects to adjacent light emitting modules.

17. The light unit according to claim 13, wherein the module connection member comprises a flexible flat cable or a flexible printed circuit board, and
wherein the light emitting module comprises a PCB (printed circuit board).

18. The light unit according to claim 13, wherein the module terminals of the module connection member comprise first module terminals and second module terminals at predetermined intervals, and
wherein each of the light emitting modules comprises a first terminal connected to the first module terminals and a second module terminal connected to the second module terminals.

19. A display apparatus comprising:
a bottom cover comprising a bottom surface with a plurality of protrusions;
a module connection member on the bottom surface of the bottom cover and comprising module terminals disposed at least one of the protrusions of the bottom cover;
a plurality of light emitting modules on the module connection member and comprising a light emitting diode and a connection terminals electrically connected to the module terminals of the module connection member;
an optical sheet unit on the plurality of light emitting modules; and
a display panel on the optical sheet unit,
wherein the module connection member is disposed between the plurality of light emitting modules and a bottom surface of the bottom cover,
wherein the plurality of protrusions are convexly protruded on the bottom surface of the bottom cover, and
wherein the module terminals are disposed between the connection terminals of each of the light emitting modules and each of the protrusions of the bottom cover.

20. The display apparatus according to claim 19, comprising a fixing member couples with the light emitting modules and the module connection member to the bottom cover.

* * * * *